United States Patent Office 2,781,367
Patented Feb. 12, 1957

2,781,367

HYDROLYSIS OF STEROID SEMICARBAZONE

John T. Day, North Plainfield, N. J., assignor to Merck & Co., Inc., Rahway, N. J., a corporation of New Jersey No Drawing. Application June 15, 1954,
Serial No. 436,991

15 Claims. (Cl. 260—397.45)

This invention is concerned generally with improved processes for the preparation of steroid compounds. More particularly, it relates to an improved method for the preparation of $\Delta^4$ - 3,20 - diketo - 17 - hydroxy - 21 - oxygenated - pregnene compounds from the corresponding $\Delta^4$ - 3,20 - diketo - 17 - hydroxy - 21 - oxygenated - pregnene 3 - semicarbazone or $\Delta^4$ - 3,20 - diketo - 17 - hydroxy - 21 - oxygenated - pregnene 3,20 - disemicarbazone. The $\Delta^4$ - 3,20 - diketo - 17 - hydroxy - 21 - oxygenated - pregnene compounds obtained in accordance with this method include the adrenal hormones cortisone, hydrocortisone, 17 - hydroxy - 11 - desoxycorticosterone, and their acetates.

Since cortisone, hydrocortisone and 17 - hydroxy - 11 - desoxycorticosterone all contain a dihydroxyacetone side chain attached to the C–17 carbon atom, and since this dihydroxyacetone grouping is extremely sensitive to mineral acids and readily undergoes degradation when treated with mineral acids, it was previously considered that the only practicable method of accomplishing the hydrolysis of semicarbazones of $\Delta^4$ - 3,20 - diketo - 17 - hydroxy - 21 - oxygenated - pregnene compounds was by means of aqueous organic acids, in particular aqueous acetic acid. Semicarbazone are, however, conventionally prepared in aqueous acetic acid solution. It is therefore apparent that the $\Delta^4$ - 3,20 - diketo - 17 - hydroxy - 21 - oxygenated - pregnene compound and semicarbazide, which are produced by the hydrolysis of the $\Delta^4$ - 3,20 - diketo - 17 - hydroxy - 21 - oxygenated - pregnene semicarbazone, would react with each other in the aqueous acetic acid medium to reform the semicarbazone reactant. Accordingly, the reaction mixture necessarily contains an equilibrium mixture of the starting reactants and hydrolysis products.

In order to achieve satisfactory yields of the desired $\Delta^4$ - 3,20 - diketo - 17 - hydroxy - 21 - oxygenated - pregnene compound, the equilibrium position must be shifted. This is currently achieved by incorporating pyruvic acid in the reaction mixture, since the pyruvic acid reacts with the semicarbazide formed by the hydrolysis reaction to produce the very stable pyruvic semicarbazone. This prior method, however, results in an unwanted by-product, the pyruvic semicarbazone, and involves a purification operation, with attendant loss of costly material, in order to separate the $\Delta^4$ - 3,20 - diketo - 17 - hydroxy - 21 - oxygenated - pregnene compound from this pyruvic semicarbazone by-product.

It is now discovered in accordance with the present invention that, in spite of the instability to mineral acids of the C–17 dihydroxyacetone side chain, aqueous mineral acids can be utilized for the hydrolysis of semicarbazones of $\Delta^4$ - 3,20 - diketo - 17 - hydroxy - 21 - oxygenated - pregnene compounds providing that the $\Delta^4$ - 3,20 - diketo - 17 - hydroxy - 21 - oxygenated - pregnene compound is reacted with the aqueous mineral acid in contact with a separate liquid phase comprising an essentially water-immiscible organic solvent. Under these reaction conditions, the semicarbazone linkages are hydrolyzed without substantially affecting other acid-sensitive groupings in the molecule. Thus, the acid-sensitive dihydroxyacetone C–17 side chain is substantially unaffected by the aqueous mineral acid during the hydrolysis reaction and, in fact, other acid-sensitive groupings, as for example acid-hydrolyzable ester groupings, are likewise substantially unaffected by this hydrolysis procedure. Moreover, the utilization of the separate water-immiscible organic solvent phase shifts the equilibrium reaction to substantially complete hydrolysis whereby the $\Delta^4$ - 3,20 - diketo - 17 - hydroxy - 21 - oxygenated - pregnene compound is obtained directly in a yield approaching that theoretically obtainable.

A feature of the invention is that the $\Delta^4$ - 3,20 - diketo - 17 - hydroxy - 21 - oxygenated - pregnene compound obtained by this procedure, being extremely soluble in the water-immiscible organic solvent phase and relatively insoluble in the aqueous phase, is selectively dissolved in the organic solvent phase and can be readily recovered therefrom in substantially pure form. A further feature of the invention is that this procedure results in the formation of a useful by-product, namely a salt of semicarbazide, and that this semicarbazide salt, by virtue of its solubility in the aqueous phase, is obtained directly in said aqueous phase free of the $\Delta^4$ - 3,20 - diketo - 17 - hydroxy - 21 - oxygenated - pregnene product.

The $\Delta^4$ - 3,20 - diketo - 17 - hydroxy - 21 - oxygenated - pregnene semicarbazones which are ordinarily utilized as starting materials in this improved process include $\Delta^4$ - 3,11,20 - triketo - 17,21 - dihydroxy - pregnene 3 - semicarbazone, $\Delta^4$ - 3,11,20 - triketo - 17,21 - dihydroxy - pregnene 3,20 - disemicarbazone, $\Delta^4$ - 3,11,20 - triketo - 17 - hydroxy - 21 - acyloxy - pregnene 3 - semicarbazone, $\Delta^4$ - 3,11,20 - triketo - 17 - hydroxy - 21 - acetoxy - pregnene 3 - semicarbazone, $\Delta^4$ - 3,11,20 - triketo - 17 - hydroxy - 21 - acyloxy - pregnene 3,20 - disemicarbazone, $\Delta^4$ - 3,11,20 - triketo - 17 - hydroxy - 21 - acetoxy - pregnene 3,20 - disemicarbazone, $\Delta^4$ - 3,20 - diketo - 11,17,21 - trihydroxy - pregnene 3 - semicarbazone, $\Delta^4$ - 3,20 - diketo - 11,17,21 - trihydroxy - pregnene 3,20 - disemicarbazone, $\Delta^4$ - 3,20 - diketo - 11,17 - dihydroxy - 21 - acyloxy - pregnene 3 - semicarbazone, $\Delta^4$ - 3,20 - diketo - 11,17 - dihydroxy - 21 - acyloxy - pregnene 3 - semicarbazone, $\Delta^4$ - 3,20 - diketo - 11,17 - dihydroxy - 21 - acetoxy - pregnene 3 - semicarbazone, $\Delta^4$ - 3,20 - diketo - 11,17 - dihydroxy - 21 - acyloxy - pregnene 3,20 - disemicarbazone, $\Delta^4$ - 3,20 - diketo - 11,17 - dihydroxy - 21 - acetoxy - pregnene 3,20 - disemicarbazone, $\Delta^4$ - 3,20 - diketo - 17,21 - dihydroxy - pregnene 3 - semicarbazone, $\Delta^4$ - 3,20 - diketo - 17,21 - dihydroxy - pregnene 3,20 - disemicarbazone, $\Delta^4$ - 3,20 - diketo - 17 - hydroxy - 21 - acyloxy - pregnene 3 - semicarbazone, $\Delta^4$ - 3,20 - diketo - 17 - hydroxy - 21 - acetoxy - pregnene 3,20 - disemicarbazone, $\Delta^4$ - 3,20 - diketo - 17 - hydroxy - 21 - acyloxy - pregnene 3,20 - disemicarbazone, $\Delta^4$ - 3,20 - diketo - 17 - hydroxy - 21 - acetoxy - pregnene 3,20 - disemicarbazone, and the like.

The aqueous mineral acids which are ordinarily utilized in this improved process include the hydrohalic acids, hydrochloric acid, hydrobromic acid, hydriodic acid, phosphoric acid, sulfuric acid, and the like. I ordinarily prefer to use aqueous hydrochloric acid. The quantity of acid employed should be in excess of that needed to form the corresponding salt of semicarbazide by-product, and preferably a substantial excess of the aqueous mineral acid is employed. Since, in my improved procedure, the $\Delta^4$-3,20-diketo-17-hydroxy-21-oxygenated-pregnene obtained by hydrolysis of the semicarbazone is immediately removed from the aqueous acid phase by dissolution in the organic solvent phase, other acid-sensitive groups are unaffected by the aqueous mineral acid, and aqueous mineral acids of relatively high concentration can be employed if desired. When aqueous hydrochloric acid is used, I ordinarily utilize a concentration of about one normal to two normal.

The $\Delta^4$-3,20-diketo-17-hydroxy-21-oxygenated-pregnene compound is preferentially soluble in water-immiscible organic solvents as compared with aqueous acid solution, and any water-immiscible organic solvent can be utilized in carrying out my improved procedure. I ordinarily prefer to utilize, however, a chlorinated lower aliphatic hydrocarbon solvent such as chloroform, carbon tetrachloride, ethylene dichloride, tetrachlorethane, an aliphatic ether solvent such as dibutyl ether, tetrahydrofuran, an alkyl alkanoate, such as ethyl acetate, and the like. I particularly prefer to employ, as the water-immiscible organic solvent phase, a mixture of two or more organic solvents such as chloroform and dimethylformamide; chloroform, dimethylformamide and methanol; chloroform and tetrahydrofuran; acetone and benzene; toluene and ethanol; and the like.

The reaction can be carried out by maintaining the reaction mixture at room temperature or by heating the reaction mixture at an elevated temperature up to reflux temperature. Since the semicarbazone is rapidly hydrolyzed, a reaction time of as little as four minutes has been found to give substantially complete hydrolysis; in view of the remarkable effect of the water-immiscible organic solvent in stabilizing the acid-sensitive groupings of the $\Delta^4$-3,20-diketo-17-hydroxy-21-oxygenated-pregnene product, reaction times up to three hours under reflux have been found to result in relatively little decomposition of the acid-sensitive groupings present in the pregnene molecule.

In accordance with this improved hydrolysis procedure and utilizing the preferred starting materials enumerated hereinabove, there are obtained the corresponding $\Delta^4$-3,20-diketo-17-hydroxy-21-oxygenated-pregnene compounds such as $\Delta^4$-3,11,20-triketo-17,21-dihydroxy-pregnene, $\Delta^4$-3,11,20-triketo-17-hydroxy-21-acyloxy-pregnene, $\Delta^4$-3,11,20-triketo-17-hydroxy-21-acetoxy-pregnene, $\Delta^4$-3,20-diketo-11,17,21-trihydroxy-pregnene, $\Delta^4$-3,20-diketo-11,17-dihydroxy-21-acyloxy-pregnene, $\Delta^4$-3,20-diketo-11,17-dihydroxy-21-acetoxy-pregnene, $\Delta^4$-3,20-diketo-17,21-dihydroxy-pregnene, $\Delta^4$-3,20-diketo-17-hydroxy-21-acyloxy-pregnene, $\Delta^4$-3,20-diketo-17-hydroxy-21-acetoxy-pregnene, and the like.

The following examples illustrate methods of carrying out the present invention but it is to be understood that these examples are given for purposes of illustration and not of limitation.

*Example 1*

A mixture of about 25 g. of $\Delta^4$-3,11,20-triketo-17-hydroxy-21-acetoxy-pregnene 3-semicarbazone, 400 cc. of 1.0 N aqueous hydrochloric acid, and 350 cc. of chloroform was heated under reflux for a period of about twenty minutes. During this heating period, the solid phase disappeared leaving two clear liquid phases. The chloroform layer was separated, and the aqueous layer was extracted with two 35 cc.-portions of chloroform. The chloroform solutions were combined, mixed with 400 cc. of 1.0 N aqueous hydrochloric acid, and the resulting mixture was heated under reflux for a period of approximately twenty minutes. The chloroform layer was separated, and the aqueous layer was extracted with two 35 cc.-portions of chloroform.

The chloroform solutions were combined, washed with a 5% aqueous sodium bicarbonate solution which, in turn, was backwashed with chloroform. The combined chloroform solutions were evaporated under reduced pressure, and the chloroform was displaced by acetone. The resulting acetone slurry was filtered, and the insoluble material was washed with acetone and dried to give approximately 20 g. of substantially pure cortisone acetate.

*Example 2*

A mixture of about 25 g. of $\Delta^4$-3,11,20-triketo-17-hydroxy-21-acetoxy-pregnene 3-semicarbazone, 400 cc. of 1.0 N aqueous hydrochloric acid, 350 cc. of chloroform, and 50 cc. of dimethylformamide was heated under reflux for a period of about twenty minutes. During this heating period, the solid phase disappeared leaving two clear liquid phases. The chloroform layer was separated, and the aqueous layer was extracted with two 35 cc.-portions of chloroform. The chloroform solutions were combined, mixed with 400 cc. of 1.0 N aqueous hydrochloric acid, and the resulting mixture was heated under reflux for a period of approximately twenty minutes. The chloroform layer was separated, and the aqueous layer was extracted with two 35 cc.-portions of chloroform.

The chloroform solutions were combined, washed with a 5% aqueous sodium bicarbonate solution which, in turn, was backwashed with chloroform. The combined chloroform solutions were evaporated under reduced pressure, and the chloroform was displaced by acetone. The resulting acetone slurry was filtered, and the insoluble material was washed with acetone and dried to give approximately 20 g. of substantially pure cortisone acetate.

*Example 3*

A mixture of about 25 g. of $\Delta^4$-3,11,20-triketo-17-hydroxy-21-acetoxy-pregnene 3-semicarbazone, 400 cc. of 1.0 N aqueous hydrochloric acid, 350 cc. of chloroform, 100 cc. of methanol, and 50 cc. of dimethylformamide was stirred at room temperature for a period of about three hours. During this heating period, the solid phase disappeared leaving two clear liquid phases. The chloroform layer was separated, and the aqueous layer was extracted with two 35 cc.-portions of chloroform. The chloroform solutions were combined, mixed with 400 cc. of 1.0 N aqueous hydrochloric acid, and the resulting mixture was heated under reflux for a period of approximately twenty minutes. The chloroform layer was separated, and the aqueous layer was extracted with two 35 cc.-portions of chloroform.

The chloroform solutions were combined, washed with a 5% aqueous sodium bicarbonate solution which, in turn, was backwashed with chloroform. The combined chloroform solutions were evaporated under reduced pressure, and the chloroform was displaced by acetone. The resulting acetone slurry was filtered, and the insoluble material was washed with acetone and dried to give approximately 20 g. of substantially pure cortisone acetate.

*Example 4*

A mixture of 11.91 g. of $\Delta^4$-3,20-diketo-11,17,21-trihydroxy-pregnene 3,20-disemicarbazone, 240 ml. of chloroform, 160 ml. of tetrahydrofuran, and 400 ml. of 1.25 N aqueous hydrochloric acid was heated under reflux for a period of about four minutes. The resulting clear, two-phase system was cooled to a temperature of approximately 45° C., and the layers were separated. The aqueous layer was treated successively with two 100 ml.-portions and two 50 ml.-portions of a 3:2 chloroform-tetrahydrofuran solution, the treatment, in each case, consisting of heating the aqueous layer and the chloroform-tetrahydrofuran solution under reflux for a period of about four minutes. The resulting clear, two-phase system was cooled to a temperature of approximately 45° C., and the layers were separated. The aqueous layer was treated successively with two 100 ml.-portions and two 50 ml.-portions of a 3:2 chloroform-tetrahydrofuran solution, the treatment, in each case, consisting of heating the aqueous layer and the chloroform-tetrahydrofuran solution under reflux for a period of four minutes. The spent aqueous layer was then cooled to a temperature of 15° C. and exhaustively extracted with three 50 ml.-portions of a 3:2 chloroform-tetrahydrofuran solution. The cholorform-tetrahydrofuran solutions were then combined, the resulting solution was washed with a saturated aqueous solution of sodium bicarbonate, and the chloroform and tetrahydrofuran in the combined organic layer was replaced with ethyl acetate by evaporation in vacuo. Petroleum ether was added to the residual ethyl acetate solution, and the precipitated material was recovered by filtration and dried to give substantially pure hydrocortisone in a yield of about 95% of that theoretically obtainable.

Example 5

A mixture of 11.91 g. of $\Delta^4$-3,11,20-triketo-17,21-dihydroxy-pregnene 3,20-disemicarbazone, 240 ml. of chloroform, 160 ml. of tetrahydrofuran, and 400 ml. of 1.25 N aqueous hydrochloric acid was heated under reflux for a period of about four minutes. The resulting clear, two-phase system was cooled to a temperature of approximately 45° C., and the layers were separated. The aqueous layer was treated successively with two 100 ml.-portions and two 50 ml.-portions of a 3:2 chloroform-tetrahydrofuran solution, the treatment, in each case, consisting of heating the aqueous layer and the chloroform-tetrahydrofuran solution under reflux for a period of four minutes. The spent aqueous layer was then cooled to a temperature of 15° C. and exhaustively extracted with three 50 ml.-portions of a 3:2 chloroform-tetrahydrofuran solution. The chloroform-tetrahydrofuran solutions were then combined, the resulting solution was washed with a saturated aqueous solution of sodium bicarbonate, and the chloroform and tetrahydrofuran in the combined organic layer was replaced with ethyl acetate by evaporation in vacuo. Petroleum ether was added to the residual ethyl acetate solution, and the precipitated material was recovered by filtration and dried to give substantially pure cortisone in a yield of about 95% of that theoretically obtainable.

Example 6

A mixture of 11.91 g. of $\Delta^4$-3,20-diketo-11,17,21-trihydroxy-pregnene 3,20-disemicarbazone, 240 ml. of chloroform, 160 ml. of tetrahydrofuran, and 400 ml. of 1.25 N aqueous hydrochloric acid was maintained at room temperature for a period of about thirty minutes, and the layers were separated. The aqueous layer was treated successively with two 100 ml.-portions and two 50 ml.-portions of a 3:2 chloroform-tetrahydrofuran solution, the treatment, in each case, consisting of maintaining the aqueous layer and the chloroform-tetrahydrofuran solution at room temperature for a period of thirty minutes. The spent aqueous layer was then cooled to a temperature of 15° C. and exhaustively extracted with three 50 ml.-portions of a 3:2 chloroform-tetrahydrofuran solution. The chloroform-tetrahydrofuran solutions were then combined, the resulting solution was washed with a saturated aqueous solution of sodium bicarbonate, and the chloroform and tetrahydrofuran in the combined organic layer was replaced with ethyl acetate by evaporation in vacuo. Petroleum ether was added to the residual ethyl acetate solution, and the precipitated material was recovered by filtration and dried to give substantially pure hydrocortisone in a yield of about 97% of that theoretically obtainable.

Example 7

A mixture of 5.97 g. of $\Delta^4$-3,20-diketo-11,17,21-trihydroxy-pregnene 3,20-disemicarbazone, 15 ml. of dimethylformamide, 60 ml. of chloroform, and 150 ml. of 1.0 N aqueous hydrochloric acid was heated under reflux for a period of about three hours. The resulting two-phase system was cooled to a temperature of approximately 15° C., and the layers were separated. The aqueous layer was extracted with chloroform, and the chloroform extracts were combined with the original chloroform - dimethylformamide solution. The combined organic layer was washed with an aqueous solution of sodium bicarbonate, and the chloroform and dimethylformamide in the combined organic layer was replaced with ethyl acetate by evaporation in vacuo. Petroleum ether was added to the residual ethyl acetate solution, and the precipitated material was recovered by filtration and dried to give substantially pure hydrocortisone in a yield of about 75.4% of that theoretically obtainable.

Example 8

A mixture of 5.97 g. of $\Delta^4$-3,20-diketo-11,17,21-trihydroxy-pregnene 3,20-disemicarbazone, 15 ml. of dimethylformamide, 60 ml. of chloroform, and 150 ml. of 1.0 N aqueous hydrochloric acid was maintained at room temperature for a period of about three hours. The resulting two-phase system was cooled to a temperature of approximately 15° C., and the layers were separated. The aqueous layer was extracted with chloroform, and the chloroform extracts were combined with the original chloroform-dimethylformamide solution. The combined organic layer was washed with an aqueous solution of sodium bicarbonate, and the chloroform and dimethylformamide in the combined organic layer was replaced with ethyl acetate by evaporation in vacuo. Petroleum ether was added to the residual ethyl acetate solution, and the precipitated material was recovered by filtration and dried to give substantially pure hydrocortisone in a yield of about 74.0% of that theoretically obtainable.

Example 9

A mixture of about 40 g. of $\Delta^4$-3,20-diketo-17-hydroxy-21-acetoxy-pregnene 3-semicarbazone, 600 cc. of chloroform, and 700 cc. of 1.0 N aqueous hydrochloric acid were heated under reflux with agitation for a period of approximately twenty minutes. The resulting mixture was cooled to a temperature of about 35° C., the layers were separated from each other, and the aqueous layer was extracted with chloroform. The chloroform extracts were combined with the original chloroform layer, 350 cc. of 1.0 N aqueous hydrochloric acid was added, and the mixture was heated under reflux for a period of approximately twenty minutes. The resulting mixture was cooled to a temperature of approximately 35° C., the layers were separated, and the aqueous layer was extracted with chloroform. The chloroform layer and extracts were combined, and the combined chloroform solution was washed with 200 cc. of a 5% aqueous sodium bicarbonate solution which, in turn, was backwashed with chloroform. The chloroform washings were added to the combined chloroform solution and the chloroform was displaced therefrom with acetone by evaporation in vacuo. The insoluble material was recovered from the resulting acetone slurry by filtration, washed with acetone, and dried to give approximately 35.0 g. of substantially pure $\Delta^4$-17$\alpha$-hydroxy-21-acetoxy-pregnene-3,20-dione; yield approximately 90% of theory.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting a semicarbazone of a $\Delta^4$-3,20-diketo-17-hydroxy-21-oxygenated-pregnene compound with an aqueous mineral acid in contact with a separate liquid phase comprising an essentially water-immiscible organic solvent, thereby hydrolyzing the semicarbazone linkages without substantially affecting other acid-sensitive groupings in the molecule, to produce a solution of the $\Delta^4$-3,20-diketo-17-hydroxy-21-oxygenated-pregnene compound in the organic solvent phase and a solution of the corresponding salt of semicarbazide in the aqueous phase, and separating said organic solvent phase from the reaction mixture.

2. The process which comprises reacting a semicarbazone of a $\Delta^4$-3,20-diketo-17,21-dihydroxy-pregnene compound with an aqueous mineral acid in contact with a separate liquid phase comprising an essentially water-immiscible organic solvent, thereby hydrolyzing the semicarbazone linkages without substantially affecting other acid-sensitive groupings in the molecule, to produce a solution of the $\Delta^4$-3,20-diketo-17,21-dihydroxy-pregnene compound in the organic solvent phase and a solution of the corresponding salt of semicarbazide in the aqueous phase, and separating said organic solvent phase from the reaction mixture.

3. The process which comprises reacting a semicarbazone of a $\Delta^4$-3,20-diketo-17-hydroxy-21-acyloxy-pregnene compound with an aqueous mineral acid in contact with a separate liquid phase comprising an essentially water-immiscible organic solvent, thereby hydrolyzing the semicarbazone linkages without substantially affecting other acid-sensitive groupings in the molecule, to produce a solution of the $\Delta^4$-3,20-diketo-17-hydroxy-21-acyloxy-pregnene compound in the organic solvent phase and a solution of the corresponding salt of semicarbazide in the aqueous phase, and separating said organic solvent phase from the reaction mixture.

4. The process which comprises reacting a semicarbazone of a $\Delta^4$-3,20-diketo-17-hydroxy-21-oxygenated-pregnene compound with an aqueous mineral acid in contact with a separate liquid phase comprising a chlorinated lower aliphatic hydrocarbon solvent, thereby hydrolyzing the semicarbazone linkages without substantially affecting other acid-sensitive groupings in the molecule, to produce a solution of the $\Delta^4$-3,20-diketo-17-hydroxy-21-oxygenated-pregnene compound in the chlorinated lower aliphatic hydrocarbon solvent phase and a solution of the corresponding salt of semicarbazide in the aqueous phase, and separating said chlorinated lower aliphatic hydrocarbon solvent phase from the reaction mixture.

5. The process which comprises reacting a semicarbazone of a $\Delta^4$-3,20-diketo-17-hydroxy-21-oxygenated-pregnene compound with an aqueous mineral acid in contact with a separate liquid phase comprising an aliphatic ether solvent, thereby hydrolyzing the semicarbazone linkages without substantially affecting other acid-sensitive groupings in the molecule, to produce a solution of the $\Delta^4$-3,20-diketo-17-hydroxy-21-oxygenated-pregnene compound in the aliphatic ether solvent phase and a solution of the corresponding salt of semicarbazide in the aqueous phase, and separating said aliphatic ether solvent phase from the reaction mixture.

6. The process which comprises reacting $\Delta^4$-3,11,20-triketo-17,21-dihydroxy-pregnene 3-semicarbazone with aqueous hydrochloric acid in contact with a separate liquid phase comprising chloroform, thereby hydrolyzing the semicarbazone linkages without substantially affecting other acid-sensitive groupings in the molecule, to produce a solution of $\Delta^4$-3,11,20-triketo-17,21-dihydroxy-pregnene in the chloroform phase and a solution of semicarbazide hydrochloride in the aqueous phase, and separating said chloroform phase from the reaction mixture.

7. The process which comprises reacting $\Delta^4$-3,11,20-diketo-17-hydroxy-21-acetoxy-pregnene 3-semicarbazone with aqueous hydrochloric acid in contact with a separate liquid phase comprising chloroform, thereby hydrolyzing the semicarbazone linkages without substantially affecting other acid-sensitive groupings in the molecule to produce a solution of $\Delta^4$-3,11,20-triketo-17-hydroxy-21-acetoxy-pregnene in the chloroform phase and a solution of semicarbazide hydrochloride in the aqueous phase, and separating said chloroform phase from the reaction mixture.

8. The process which comprises reacting $\Delta^4$-3,20-diketo-11,17,21-trihydroxy-pregnene 3,20-disemicarbazone with aqueous hydrochloric acid in contact with a separate liquid phase comprising chloroform, thereby hydrolyzing the semicarbazone linkages without substantially affecting other acid-sensitive groupings in the molecule, to produce a solution of $\Delta^4$-3,20-diketo-11,17,21-trihydroxy-pregnene in the chloroform phase and a solution of semicarbazide hydrochloride in the aqueous phase, and separating said chloroform phase from the reaction mixture.

9. The process which comprises reacting $\Delta^4$-3,20-diketo-11,17-dihydroxy-21-acetoxy-pregnene 3,20-disemicarbazone with aqueous hydrochloric acid in contact with a separate liquid phase comprising chloroform, thereby hydrolyzing the semicarbazone linkages without substantially affecting other acid-sensitive groupings in the molecule, to produce a solution of $\Delta^4$-3,20-diketo-11,17-dihydroxy-21-acetoxy-pregnene in the chloroform phase and a solution of semicarbazide hydrochloride in the aqueous phase, and separating said chloroform phase from the reaction mixture.

10. The process which comprises reacting $\Delta^4$-3,11,20-diketo-17-hydroxy-21-acetoxy-pregnene 3-semicarbazone with aqueous hydrochloric acid in contact with a separate liquid phase comprising chloroform and dimethylformamide, thereby hydrolyzing the semicarbazone linkages without substantially affecting other acid-sensitive groupings in the molecule, to produce a solution of $\Delta^4$-3,11,20-triketo-17-hydroxy-21-acetoxy-pregnene in the chloroform-dimethylformamide phase and a solution of semicarbazide hydrochloride in the aqueous phase, and separating said chloroform-dimethylformamide phase from the reaction mixture.

11. The process which comprises reacting $\Delta^4$-3,11,20-triketo-17-hydroxy-21-acetoxy-pregnene-3-semicarbazone with aqueous hydrochloric acid in contact with a separate liquid phase comprising chloroform, dimethylformamide and methanol, thereby hydrolyzing the semicarbazone linkages without substantially affecting other acid-sensitive groupings in the molecule, to produce a solution of $\Delta^4$-3,11,20-triketo-17-hydroxy-21-acetoxy-pregnene in the chloroform-dimethylformamide-methanol phase and a solution of semicarbazide hydrochloride in the aqueous phase, and separating said chloroform-dimethylformamide-methanol phase from the reaction mixture.

12. The process which comprises reacting $\Delta^4$-3,11,20-triketo-17-hydroxy-21-acetoxy-pregnene 3,20-disemicarbazone with aqueous hydrochloric acid in contact with a separate liquid phase comprising chloroform and tetrahydrofuran, thereby hydrolyzing the semicarbazide linkages without substantially affecting other acid-sensitive groupings in the molecule, to produce a solution of $\Delta^4$-3,11,20-triketo-17-hydroxy-21-acetoxy-pregnene in the chloroform-tetrahydrofuran phase and a solution of semicarbazide hydrochloride in the aqueous phase, and separating said chloroform-tetrahydrofuran phase from the reaction mixture.

13. The process which comprises reacting $\Delta^4$-3,20-diketo-11,17,21-trihydroxy-pregnene 3,20-disemicarbazone with aqueous hydrochloric acid in contact with a separate liquid phase comprising chloroform and tetrahydrofuran, thereby hydrolyzing the semicarbazone linkages without substantially affecting other acid-sensitive groupings in the molecule, to produce a solution of $\Delta^4$-3,20-diketo-11,17,21-trihydroxy-pregnene in the chloroform-tetrahydrofuran phase and a solution of semicarbazide hydrochloride in the aqueous phase, and separating said chloroform-tetrahydrofuran phase from the reaction mixture.

14. The process which comprises reacting $\Delta^4$-3,20-diketo-11,17,21-trihydroxy-pregnene 3,20-disemicarbazone with aqueous hydrochloric acid in contact with a separate liquid phase comprising chloroform and dimethylformamide, thereby hydrolyzing the semicarbazide linkages without substantially affecting other acid-sensitive groupings in the molecule, to produce a solution of $\Delta^4$-3,20-diketo-11,17,21-trihydroxy-pregnene in the chloroform-dimethylformamide phase and a solution of semicarbazide hydrochloride in the aqueous phase, and separating said chloroform-dimethylformamide phase from the reaction mixture.

15. The process which comprises reacting $\Delta^4$-3,20-diketo-17-hydroxy-21-acetoxy-pregnene 3-semicarbazone with aqueous hydrochloric acid in contact with a separate liquid phase comprising chloroform, thereby hydrolyzing the semicarbazide linkages without substantially affecting other acid-sensitive groupings in the molecule, to produce a solution of $\Delta^4$-3,20-diketo-17-hydroxy-21-acetoxy-pregnene in the chloroform phase and a solution of semicarbazide hydrochloride in the aqueous phase, and separating said chloroform phase from the reaction mixture.

References Cited in the file of this patent

UNITED STATES PATENTS

| | | |
|---|---|---|
| 2,530,334 | Kopp | Nov. 14, 1950 |
| 2,656,367 | Graber | Oct. 20, 1953 |